(12) United States Patent
Pei et al.

(10) Patent No.: US 11,634,321 B2
(45) Date of Patent: Apr. 25, 2023

(54) HYDROGEN STORAGE PRODUCT AND METHOD FOR MANUFACTURING SAME

(71) Applicant: Hydrogen In Motion Inc. (H2M), Vancouver (CA)

(72) Inventors: Pei Pei, Surrey (CA); Michael Brian Whitwick, Surrey (CA); Andrey Tokarev, Surrey (CA); Sahida Kureshi, Richmond (CA); Erik Kjeang, Delta (CA); Mark Cannon, Vancouver (CA); Grace Quan, Vancouver (CA)

(73) Assignee: HYDROGEN IN MOTION INC. (H2M), Vancouver (CA)

(*) Notice: Subject to any disclaimer, the term of this patent is extended or adjusted under 35 U.S.C. 154(b) by 629 days.

(21) Appl. No.: 16/616,886

(22) PCT Filed: May 18, 2018

(86) PCT No.: PCT/CA2018/050592
§ 371 (c)(1),
(2) Date: Nov. 25, 2019

(87) PCT Pub. No.: WO2018/218339
PCT Pub. Date: Dec. 6, 2018

(65) Prior Publication Data
US 2021/0147227 A1    May 20, 2021

Related U.S. Application Data

(60) Provisional application No. 62/513,242, filed on May 31, 2017.

(51) Int. Cl.
*C01B 3/00* (2006.01)
*C01B 32/198* (2017.01)
(Continued)

(52) U.S. Cl.
CPC ......... *C01B 3/0084* (2013.01); *B01J 20/0248* (2013.01); *B01J 20/04* (2013.01);
(Continued)

(58) Field of Classification Search
None
See application file for complete search history.

(56) References Cited

U.S. PATENT DOCUMENTS

| 6,672,077 B1 | 1/2004 | Bradley et al. |
| 9,428,394 B2 | 8/2016 | Tour et al. |

(Continued)

FOREIGN PATENT DOCUMENTS

| CN | 103771398 | 5/2014 |
| CN | 103787308 | 5/2014 |

(Continued)

OTHER PUBLICATIONS

English text machine translation of Chang et al. (KR 2015-0112225 A) Description and Claims, accessed online from Espacenet, pp. 1-25. (Year: 2015).*

(Continued)

*Primary Examiner* — Katie L. Hammer
(74) *Attorney, Agent, or Firm* — Davis Wright Tremaine LLP; Heather M. Colburn

(57) ABSTRACT

The hydrogen storage product comprises one or more reduced-graphene oxide layers functionalized with a boron species and decorated with an alkali or alkaline earth metal. Each layer of the structure further comprises boron-oxygen functional groups comprising oxygen atoms bonded to boron atoms. The hydrogen storage product has a composition suitable for physisorption of hydrogen molecule, and operates to reversibly store hydrogen under operating conditions of low pressure and ambient temperature.

11 Claims, 8 Drawing Sheets

(51) Int. Cl.
| | |
|---|---|
| *B01J 20/20* | (2006.01) |
| *B01J 20/02* | (2006.01) |
| *B01J 20/04* | (2006.01) |
| *B01J 20/28* | (2006.01) |
| *B82Y 30/00* | (2011.01) |
| *B82Y 40/00* | (2011.01) |
| *B01J 20/30* | (2006.01) |

(52) U.S. Cl.
CPC ....... *B01J 20/205* (2013.01); *B01J 20/28035* (2013.01); *B01J 20/28083* (2013.01); *C01B 3/0021* (2013.01); *C01B 32/198* (2017.08); *B01J 20/3078* (2013.01); *B01J 20/3085* (2013.01); *B82Y 30/00* (2013.01); *B82Y 40/00* (2013.01); *C01P 2006/16* (2013.01); *Y02E 60/32* (2013.01)

(56) References Cited

U.S. PATENT DOCUMENTS

| | | | |
|---|---|---|---|
| 9,440,850 | B2 | 9/2016 | Bourlinos et al. |
| 2005/0075245 | A1 | 4/2005 | Goddard et al. |
| 2006/0019162 | A1* | 1/2006 | Shirahige ............... C01B 32/22 429/218.2 |
| 2016/0376154 | A1 | 12/2016 | Lee |

FOREIGN PATENT DOCUMENTS

| | | | |
|---|---|---|---|
| CN | 104069811 | 10/2014 | |
| CN | 105621393 | 6/2016 | |
| CN | 105964263 | 9/2016 | |
| CN | 106365158 | 2/2017 | |
| CN | 106517090 | 3/2017 | |
| JP | 2006-320853 | 11/2006 | |
| KR | 2015112225 A * | 10/2015 | ......... C01B 31/0438 |
| WO | 2004-048259 | 6/2004 | |
| WO | 2013/077325 | 5/2013 | |

OTHER PUBLICATIONS

Nachimuthu et al., "A First Principles study on Boron-doped Graphene decorated by Ni—Ti—Mg atoms for Enhanced Hydrogen Storage Performance", Scientific Reports, vol. 5:16797 (Nov. 18, 2015), pp. 1-8.
Shayeganfar et al., "Oxygen- and Lithium-Doped Hybrid Boron-Nitride/Carbon Networks for Hydrogen Storage", Langmuir, vol. 32 (2016), pp. 13313-13321.
Wang et al., "Lithium decoration of three dimensional boron-doped graphene frameworks for high-capacity hydrogen storage", Applied Physics Letters, vol. 106 (2015), pp. 063901-1 to 063901-5.
Wang et al., "Boric acid assisted reduction of graphene oxide: A promising material for sodium ion batteries", ACS Applied Materials and Interfaces, vol. 8 (2016), pp. 18860-18866.
Office Action, dated Mar. 25, 2021, received in Indian Application No. 201947054185.
Office Action, dated Feb. 21, 2022, received in Japanese Application No. 2020-517240.
English Translation of Office Action, dated Feb. 21, 2022, received in Japanese Application No. 2020-517240.
B. Bandyopadhyay et al. Development of a Sievert's type gas doping apparatus. Bull Mater Sci 1987;9:305-308.
D.P. Broom et al. Irreproducibility in hydrogen storage material research. Energy Environ. Sci., 2016,9, 3368-3380, 10.1039/C6EE01435F.
Katherine E. Hurst et al. An International Laboratory Comparison Study of Volumetric and Gravimetric Hydrogen Adsorption Measurements. ChemPhysChem. 2019, 20, 1997-2009. DOI: 10.1002/cphc.201900166.
Tokarev et al., Modelling Hydrogen Storage in Boron-substituted Graphene Decorated With Potassium Metal Atoms. International Journal of Energy Research. 2014.
Guybong Kim et al., Crossover between multipole Coulob and Kubas interactions in hydrogen adsorption on metal-graphene complexes. Physical Review B. 2009, vol. 79, No. 15. XP055765491.
Elham Beheshti et al. A first-principles study of calcium-decorated, boron-doped graphene for high capacity hydrogen storage. Carbon, Elsevier Oxford, GB. 2010, vol. 49, No. 5, 1561-1567. XP028138700.
Valentine Tozzini et al. Prospects for hydrogen storage in graphene. Physical Chemistory Chemical Physics. 2013, vol. 15, No. 1, 80-89. XP055765778.
Jacob W. Burress et al. Graphene Oxide Framework Materials: Theoretical Predictions and Experimental Results. Angewandte Chemie International Edition. 2010. vol. 49, No. 47, 8902-8904. XP055765512.
Yan Gao et al. Hydrogen spillover storage on Ca-decorated graphene. International Journal of Hydrogen Energy, Elsevier Science Publishers B.C., Barking, GB. 2012, vol. 37, No. 16, 11835-11841. XP028405624.
Extended European Search Report on corresponding EP patent application No. 18810560.5, dated Feb. 1, 2021.
International Search Report and Written Opionion, dated Aug. 8, 2018, received in International Application No. PCT/CA2018/050592.
Office Action, dated Jul. 29, 2922, received in Chines Application No. 201880035838.0.

* cited by examiner

HYDROGEN STORAGE PRODUCT AND METHOD FOR MANUFACTURING SAME

CROSS-REFERENCE TO RELATED APPLICATIONS

The present application is a U.S. National Stage entry under 35 U.S.C. § 371 of International Application No. PCT/CA2018/050592, filed on May 18, 2018, designating the United States of America and published in English on Dec. 6, 2018, which in turn claims the benefit of U.S. Provisional Application No. 62/513,242, filed on May 31, 2017.

FIELD

This disclosure relates generally to a hydrogen storage product and a method for manufacturing same.

BACKGROUND

Hydrogen is a relatively clean and efficient energy carrier that can be produced, stored and consumed in a more environmental-friendly manner compared to traditional fossil fuels. However, there are technical hurdles that present challenges to a wider adoption of hydrogen in storage and transportation applications. For example, in automotive fuel cell applications, vehicular size and weight constraints present challenges to hydrogen storage. A typical automobile will consume about 4 kg of hydrogen in order to travel 400 km. But 4 kg of hydrogen will occupy about 45 $m^3$ of volume under ambient temperature and pressure. Various hydrogen storage technologies have been developed to reduce storage volume. Known storage methods include compressing gas and cryogenic liquefaction. However, both of these methods have significant disadvantages. A compressed hydrogen gas storage tank is typically designed to sustain high pressures in the order of 700 bars, and such tanks tend to be costly to manufacture and relatively bulky; further, damaging a highly pressurized tank, e.g. in a collision, can have disastrous consequences. In a liquid hydrogen storage tank storing hydrogen by cryogenic liquefaction, hydrogen must be cooled down to $-252°$ C., and the energy consumed during this process can equal ⅓ of the energy stored by the hydrogen. Moreover, a liquid hydrogen storage tank typically has an open system design to avoid excessive pressure in the system, but such a design can lead to evaporation losses in the amount of 0.6-3% per day.

Solid state hydrogen storage under room temperature and moderate pressure (e.g. below 50 bar) has been proposed as a promising solution to the problems encountered by traditional hydrogen storage methods. Hydrogen molecules stored in solid state hydrogen storage materials are attracted either by physisorption or chemical binding, which enables extremely dense packing even beyond the liquid state.

Carbon nanomaterials have been proposed as a potential hydrogen storage media due to their high specific surface area, light weight and flexibility. The hydrogen adsorbed by carbon materials is proportional to the specific surface area of adsorbent, and generally a higher surface area means a higher hydrogen storage capacity. Graphene and analogous materials such as reduced graphene oxide are a type of carbon nanomaterial and possess a theoretical specific surface area of 2600 $m^2$/g, and thus are promising for hydrogen storage application. Compared to other carbon nanomaterials, graphene has the majority of its atoms as surface atoms, which makes graphene a good adsorbent candidate. Furthermore, the atomic structure of graphene is robust, and can sustain intensive mechanical distortion and chemical modification. Its sp2 C—C bonding also makes the doping and decoration of heteroatoms into graphene structure possible. While graphene shows promises for hydrogen storage applications, pristine graphene can only provide high hydrogen storage capacity at extremely low temperatures, in the order of 77K ($-196°$ C.). Maintaining such a low temperature requires substantial energy consumption thus reducing energy efficiency.

In order to store hydrogen at ambient temperature and moderate pressure, the affinity between graphene and hydrogen needs to be enhanced. Methods have been proposed to achieve high affinity of graphene to hydrogen, including decoration of the grapheme with metallic catalysts. Commonly used metallic catalysts include transition metals such as Pd, Pt and Ru. However, these metallic catalysts are costly, and are incapable of achieving the capacity goals specified by the U.S. Department of Energy (DOE) for hydrogen storage materials.

It is therefore desirable to provide a hydrogen storage material and method of manufacturing same that provides a solution to at least some of the drawbacks of the prior art.

SUMMARY

According to one aspect of the invention, there is provided a hydrogen storage product comprising a single or multiple layered structure comprising reduced graphene oxide functionalized with boron species and decorated with alkali or alkaline earth metal. Each layer of the structure further comprises boron-oxygen functional groups comprising oxygen atoms bonded to the boron atoms. Each layer of the structure can comprise a hexagonal lattice of carbon atoms functionalized with boron atoms. The addition of combinations of oxygen, boron, and alkali or alkaline earth metal enables the nominally inert reduced graphene oxide to store hydrogen. The structure can comprise defects with pores large enough for hydrogen molecules to pass through and access adsorption sites on the structure. The pores can have an average diameter of 5 nm to 20 nm. The structure can comprise between one and ten layers. The distance between layers can be between 0.33 nm and 1.0 nm.

The alkali or alkaline earth metal can be located at binding positions adjacent the boron atoms, or adjacent hollows of the hexagonal lattice, or adjacent carbon-boron bonds, or adjacent the boron-oxygen functional groups. The alkali or alkaline earth metal can be selected from a group consisting of Li, Na, K, Rb, Cs, Be, Mg, Ca, Sr and Ba.

The hydrogen storage material can have an atomic concentration of boron that is between 1 at. % and 10 at %, an atomic concentration of alkali or alkaline earth metal that is between 1 at. % and 15 at %, and an atomic concentration of oxygen that is between 1 at. % and 10 at %.

According to another aspect of the invention, there is provided a method for manufacturing a hydrogen storage material comprising: preparing a graphene oxide precursor; functionalizing boron into the graphene oxide precursor to produce a boron-functionalized reduced graphene oxide; and decorating an alkali or alkaline earth metal into the boron-functionalized reduced graphene oxide to produce an alkali or alkaline earth metal-decorated boron-functionalized reduced graphene oxide structure. One method of manufacture of the hydrogen storage product involves combining graphene oxide with a species of boron oxide and calcinating to form boron-functionalized reduced graphene oxide and then decorating with alkali or alkaline earth metals through pyrolysis.

The step of preparing the graphene precursor can comprise: pre-treating graphite by phosphorus pentaoxide, potassium persulfate and sulfuric acid to produce a pre-treated graphite product; dissolving the pre-treated graphite product in a mixture of sulfuric acid, phosphoric acid, and potassium permanganate with stirring and heating to produce a graphene oxide product; mixing the graphene oxide product with water and hydrogen peroxide; and washing and exfoliating the graphene oxide product. The step of functionalizing boron into the graphene oxide precursor can comprise forming a dry precursor mixture of boron oxide, boric acid or metaboric acid and graphene oxide solution; and calcinating the dry precursor mixture. The calcinating can be performed at a temperature between 600 and 1300° C. for at least 0.5 hrs. The step of decorating the alkali or alkaline earth metal into the boron-functionalized reduced graphene oxide can comprise: forming a dry precursor mixture of alkali or alkaline earth metal and boron-functionalized reduced graphene oxide and performing pyrolysis of the dry precursor mixture. The pyrolysis can be performed at a temperature between 700 and 900° C.

The alkali or alkaline earth metal can be potassium, in which case the step of forming a dry precursor mixture of alkali or alkaline earth metal and boron-functionalized reduced graphene oxide comprises mixing potassium hydroxide with the boron-doped graphene by stirring and grinding.

DRAWINGS

Figures 2A, 2B:
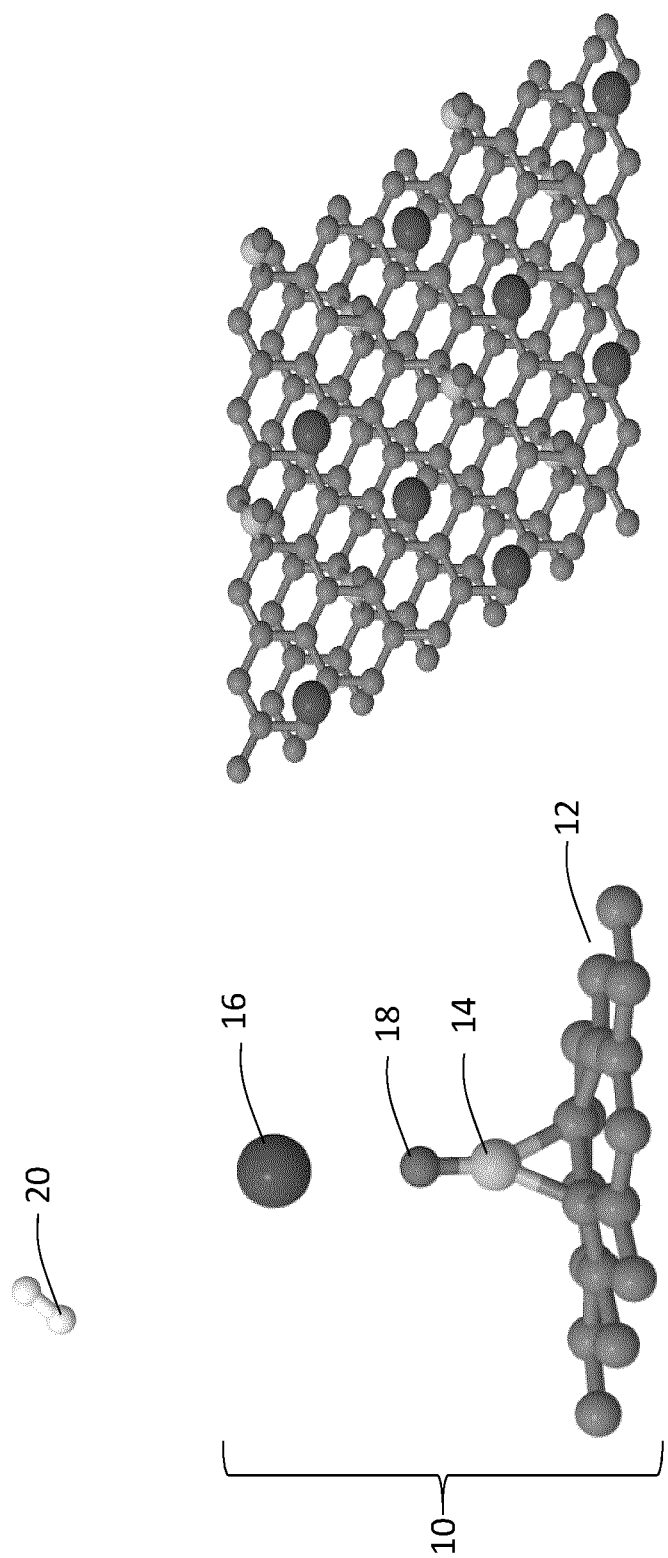
FIG. 2(a) is side perspective view of a schematic structure of a single layer portion of the hydrogen storage material manufactured according to the method shown in FIG. 1.
FIG. 2(b) is a perspective view of a double layer portion of the hydrogen storage material manufactured according to the method shown in FIG. 1.

FIGS. 5(a) to (d) are respective XPS fine scans of C 1s, O 1s, K 2s, and B 1s for the sample of the hydrogen storage material shown in FIG. 2.

Figures 6A, 6B:
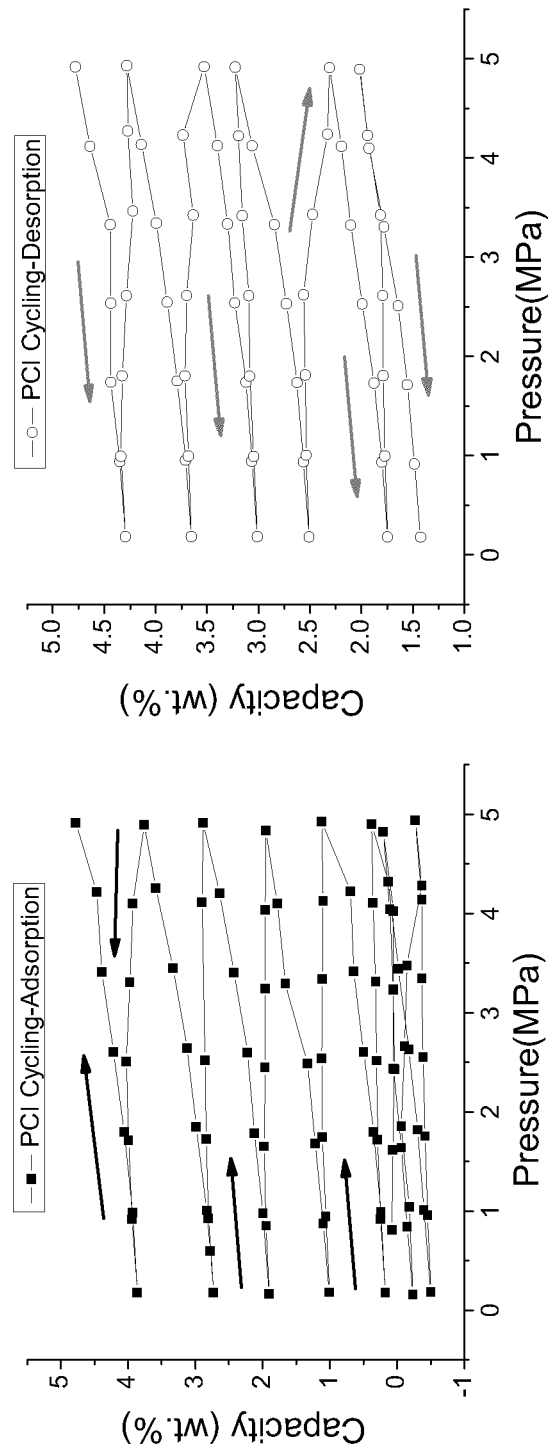

FIG. 6(a) is a graph showing hydrogen adsorption PCI curves for the hydrogen storage material synthesized by the following parameters: B2O3:GO=1:2, 1200° C. and 4 hours of calcination, KOH:BC=1:2, 750° C. and 2 hours of pyrolysis.

FIG. 6(b) is a graph showing hydrogen desorption PCI curves for the hydrogen storage material synthesized by the following parameters: B2O3:GO=1:2, 1200° C. and 4 hours of calcination, KOH:BC=1:2, 750° C. and 2 hours of pyrolysis.

Figure 6C:
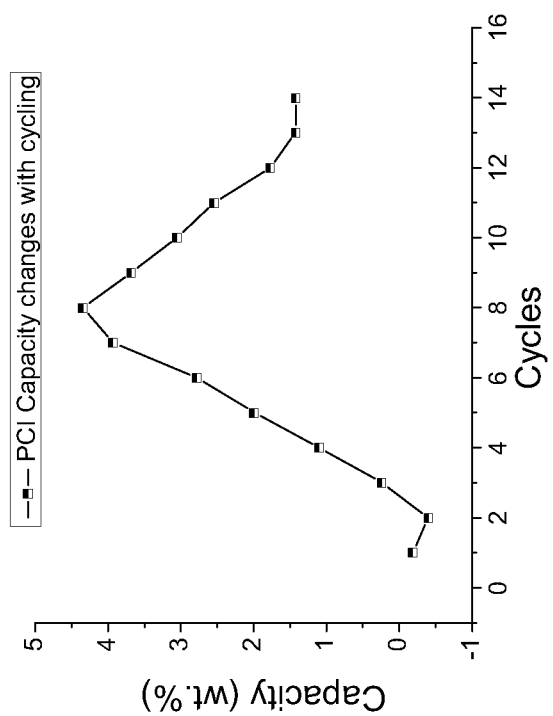

FIG. 6(c) is a graph showing the changes of capacity with cycling number for the hydrogen storage material synthesized by the following parameters: B2O3:GO=1:2, 1200° C. and 4 hours of calcination, KOH:BC=1:2, 750° C. and 2 hours of pyrolysis.

DETAILED DESCRIPTION OF EMBODIMENTS OF THE INVENTION

Overview

Embodiments of the invention relate to a hydrogen storage material that comprises one or more reduced-graphene oxide layers functionalized with a boron species and decorated with an alkali or alkaline earth metal catalyst. Examples of suitable alkali and alkaline earth metals include Li, Na, K, Rb, Cs, Be, Mg, Ca, Sr and Ba. The hydrogen storage material has a structure which comprises one or multiple layers of reduced graphene oxide produced by reducing graphene oxide, wherein each layer comprises a hexagonal lattice of carbon atoms functionalized with boron atoms. In some embodiments, some but not all of the oxygen molecules in the graphene oxide have been removed by the graphene oxide reducing process, and as a result, the hydrogen storage material can have a structure that further includes oxygen atoms bonded with boron to form boron-oxygen functional groups.

The process of reducing graphene oxide introduces defects into the surface of the hydrogen storage material's structure that cause the structure to crimp and buckle and produce pores in the structure. Point defects or carbon vacancies in the hydrogen storage material's structure are expected to attract and bind the alkaline and alkaline earth metals via carbon dangling bonds. The alkali or alkaline earth metal atoms can be at the binding positions adjacent boron atoms, or at positions adjacent hollows of hexagonal carbon rings, or at positions adjacent carbon-boron bonds, or at positions adjacent boron-oxygen functional groups. Quantum chemical calculations suggest that the presence of boron and oxygen functional groups increase the binding energy of alkaline and alkaline earth metals to the base material above the elements' cohesive energy, which may help to uniformly distribute the metal and prevent clustering of the metal into nanoparticles.

The pores in the hydrogen storage material structure allow hydrogen molecules to access adsorption sites on the material. The hydrogen molecules are attracted/bonded to the alkali and alkaline earth metals by dispersion interaction (van der Waals), or Kubas forces, or chemisorption. Hydrogen can be stored through functionalities of the carbon structure, the defect structure, the functionalized boron species, and the decorated alkali and alkaline earth metal species.

Definitions

Certain terms used in the specification have the following meaning:

Graphene oxide: a structure that comprises one or more layers of hexagonal lattice of carbon atoms that has oxygen functional groups, and the layers are not bonded through dispersion or van Der Waals interactions.

Reduced graphene oxide: a structure made by reducing graphene oxide and that comprises one or more layers of hexagonal lattice of carbon atoms that has defects and pores that disrupt this lattice in parts of the structure. Reduced graphene oxide may contain trace oxygen and may be embodied as flakes with one to ten layers.

Functionalized, Functionalization: the addition of an atom or group of atoms to an existing structure of the lattice. In terms of layered materials, this includes in-plane and out-of-plane atoms. Functional groups are the product from functionalization.

Decorated, Decoration: the addition of an out-of-plane atom or group of atoms that bonds to a function group, doped atom, or a lattice.

Defect: A disruption of the regular order of a crystal lattice, bends in the layers, including missing atoms, out of place atoms, linear dislocations, and planer dislocations.

Pore: A void in the material that was created by a tear, crack, hole, or bend in the layered structure. Typically, a pore is larger than a defect.

Pyrolysis, Pyrolyze, Calcination, Calinating; heating to high temperatures to enable thermal decomposition and chemical reactions to occur.

Manufacture

Figure 1:
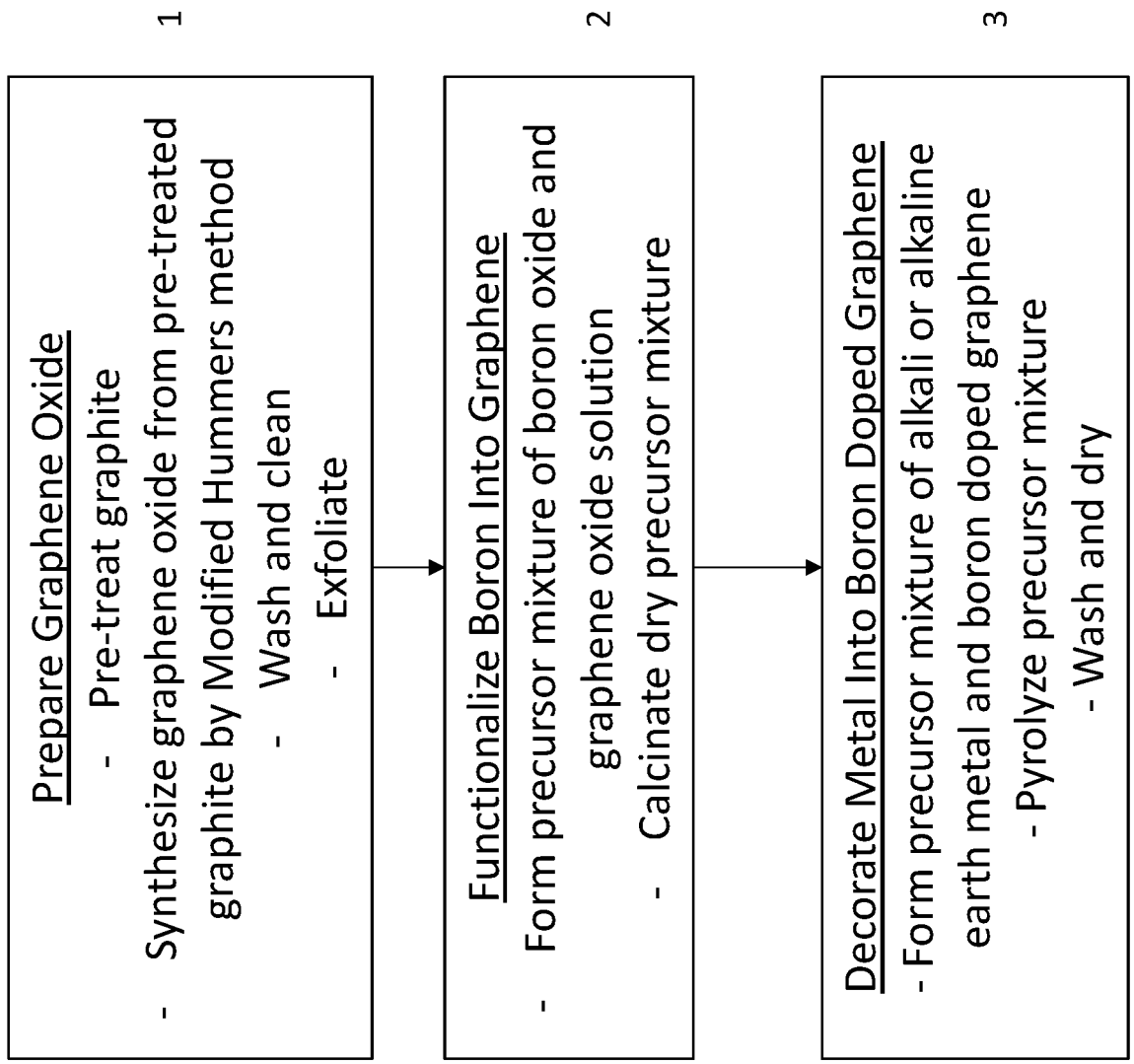
FIG. 1 is a flow chart of a method of manufacturing a hydrogen storage material according to an embodiment of the invention.

Referring now to FIG. 1, embodiments of the hydrogen storage material are manufactured according to the following process: (a) preparing graphene oxide (step 1), (b) functionalizing boron into reduced graphene oxide (step 2), and (c) decorating an alkali or alkaline earth metal into boron-functionalized reduced graphene oxide (step 3). The process can be performed by calcination, pyrolysis or hydrothermal reaction of boron and catalyst-containing graphene oxide precursors.

1. Preparing Graphene Oxide

The preparation of graphene oxide is conducted based on a modified Hummers method. In some embodiments, preparation of graphene oxide involves a pre-treatment of natural graphite by phosphorus pentoxide, potassium persulfate and concentrated sulfuric acid. A mixture of these reactants is stirred at selected temperature for a selected duration, for example, 60-90° C. and for 4.5 hours The pre-treated graphite is washed and dried for graphene oxide synthesis. The synthesis of graphene oxide follows a modified Hummers method. In some embodiments, the pre-treated graphite is dissolved into a mixture of concentrated sulfuric acid and phosphoric acid with stirring, and potassium permanganate is added. This mixture is stirred at a selected temperature for a selected period of time; for example, the selected temperature can be between 40° C. to 55° C., and the selected stirring duration can be between 12 hours to 16 hours. The resultant graphene oxide product is then poured into a mixture of ice water and hydrogen peroxide. The graphene oxide product is then washed with the assistance of hydrochloric acid to clean the product. Afterwards, a post-treatment step is used to further exfoliate the graphene oxide product. One embodiment of the post-treatment step comprises sonicating the graphene oxide product in isopropanol (IPA) for 1 hour.

2. Functionalizing Boron into Reduced Graphene Oxide;

The doping of boron into graphene begins with the preparation of a boron-containing graphene oxide precursor. In some embodiments of a precursor preparation step, boron oxide is added into a prepared graphene oxide solution with a certain ratio, and the mixture is stirred at elevated temperature in the range of 20° C. to 95° C., for example at 65° C., to form a dry precursor. In some embodiments, the mass ratio between boron oxide and graphene oxide varies from 0.25 to 1. The dry precursor is filled into an alumina boat, and then loaded into a tubular furnace for calcination. The tubular furnace is pumped and purged with argon gas, and then heated up to a selected calcination temperature for a selected duration. In some embodiments, the calcination temperature is between 600° C. and 1,300° C., and the selected duration is at least 0.5 hours and preferably between 2 hours and 4 hours, and the heating rate is about 5° C./min. The obtained product is in the form of a gray powder, which then is washed with deionized water, and dried at temperature in the range of 20° C. to 120° C., for example at 65° C.

3. Decorating Metal into Boron-Functionalized Reduced Graphene Oxide.

The decoration of an alkali or alkaline earth metal into boron-functionalized reduced graphene oxide is achieved by pyrolysis of a metal compound with the boron-functionalized reduced graphene oxide. In some embodiments, the metal is potassium, and the decoration process involves utilizing potassium hydroxide as a potassium source. The potassium hydroxide is in a powder form and is mixed with the boron-functionalized reduced graphene oxide by stirring and grinding in dry form at a selected ratio to form a precursor mixture. In some embodiments, the selected ratio between potassium hydroxide and the boron-functionalized reduced graphene oxide is between 0.25 and 1.25.

The precursor mixture is filled into a nickel boat, and loaded into a tubular furnace for pyrolysis. The tubular furnace is pumped and purged with nitrogen gas, and then heated to a selected elevated temperature at a selected heating rate under the protection of an inert gas. In some embodiments, the temperature selected to pyrolysis of the precursor is between 700° C. to 900° C. and the selected heating rate is 5° C./min. One example of a suitable inert gas is nitrogen. The resulting grayish powder is washed by DI water until the PH value is close to a designated level, which can be from 7 to 9. The washed product is then dried, for example by vacuum drying. Alternatively, the washed product can be dried by a drying process that involves freeze-drying.

Structure

Referring now to FIGS. 2 to 5, embodiments of a hydrogen storage material 10 made by the above process has a generally two-dimensional layered structure, wherein each layer comprises a graphene plane 12 produced by reducing graphene oxide, functionalized by boron atoms 14, and decorated by alkali or alkaline metal atoms 16. In some embodiments, and as shown in FIGS. 2(a) and (b), the hydrogen storage material's structure includes oxygen atoms 18 bonded to the boron atoms 14 to form boron-oxygen functional groups and the atoms 16 are potassium atoms. The potassium atoms 16 can be located in the binding positions above the boron atoms 14, or above the hollows of six-membered carbon rings of the reduced graphene oxide plane 12, or above the carbon-boron bonds, or above the boron functional group 14-18.

Figure 3:
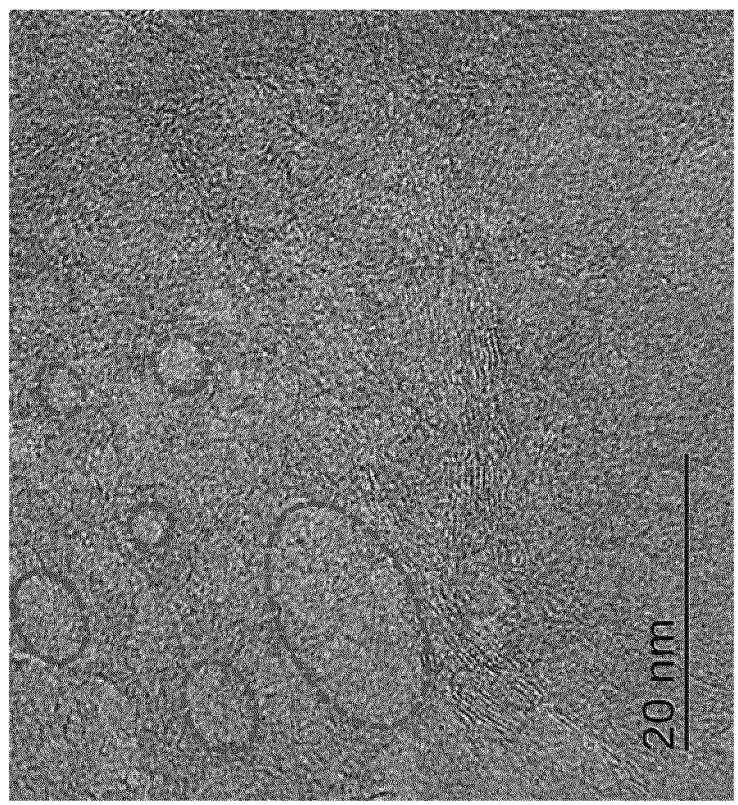
FIG. 3 is a transmission electron microscopy (TEM) image of a sample of the hydrogen storage material manufactured according to the following parameters: B2O3:GO=1:2, 1200° C. and 4 hours of calcination, KOH:BC=1:2, 750° C. and 2 hours of pyrolysis. Circled portions indicate pores in the material.

The distance between layers can vary from 0.33 nm to 1.0 nm, and the layer number of a single flake of the hydrogen storage material 10 can vary from one layer to ten layers The hydrogen storage material 10 has a distorted and defective layered structure that results from each reduced graphene oxide plane 12 being produced by reducing graphene oxide. In other words, the hydrogen storage material 12 has a structure that is distinctive of this production process. The created defects increases the specific surface area of the hydrogen storage material 10 which is expected to also increase the attraction to hydrogen molecules 20 by forming potential wells in the vicinity of the defects. FIG. 3 shows a transmission electron microscopy (TEM) image of a sample hydrogen storage material that was synthesized by the above process and according to the following parameters: B2O3:GO=1:2, 1200° C. and 4 hours of calcination, KOH:BC=1:2, 750° C. and 2 hours of pyrolysis. As can be seen in this Figure, the layers are highly crimped, and feature pores (circled in FIG. 3) with average diameters between 5 nm to 20 nm.

Figure 4:
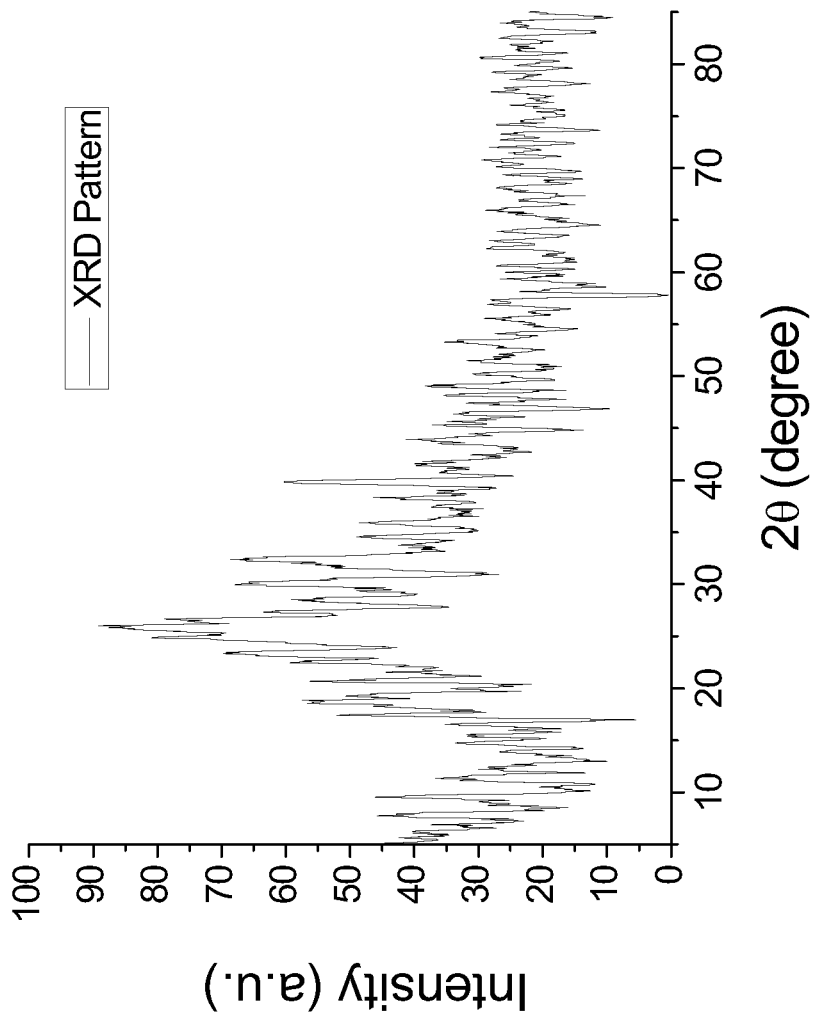
FIG. 4 is an X-ray diffraction (XRD) spectrum of the sample of the hydrogen storage material shown in FIG. 2.

The structure of the hydrogen storage material 10 can also be seen by way of an X-ray diffraction (XRD) examination. FIG. 4 shows an XRD spectrum of the sample hydrogen storage material. This XRD spectrum reveals the sample hydrogen storage material to have a diffraction peak of around 26 degrees, corresponding to a layer spacing of 0.34 nm Since the boron and potassium are respectively functionalized and decorated into the reduced graphene oxide atomically, there are no discernible peaks corresponding to boron compound or potassium compound in the XRD spectrum of the hydrogen storage material; the broad peak at 26 degrees indicates that the layered structure of the sample hydrogen storage material is highly distorted and amorphous.

Figure 5A:
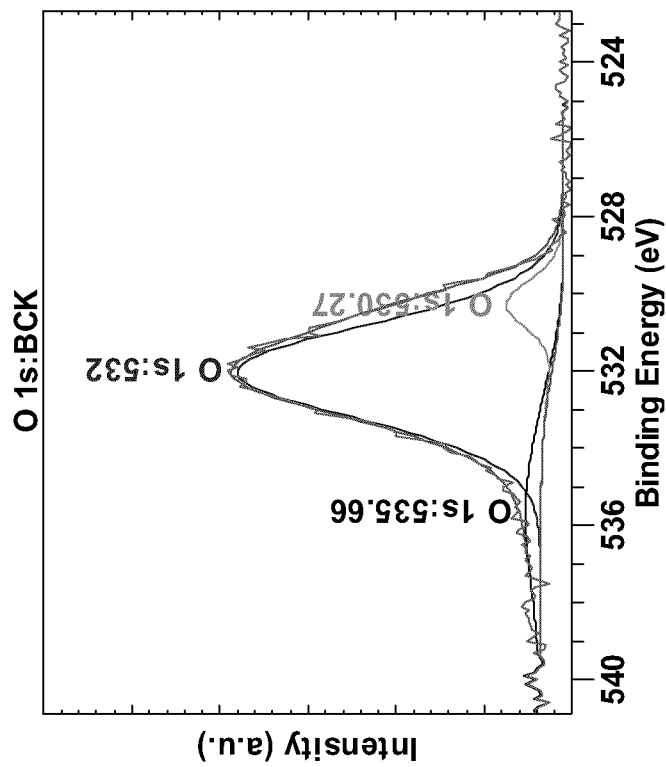
Figure 5B:
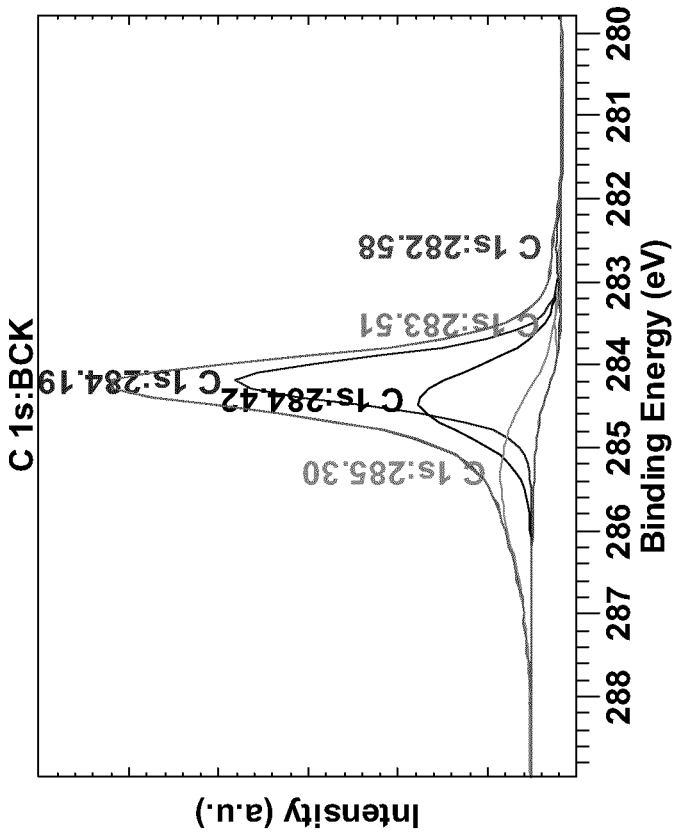
Figure 5D:
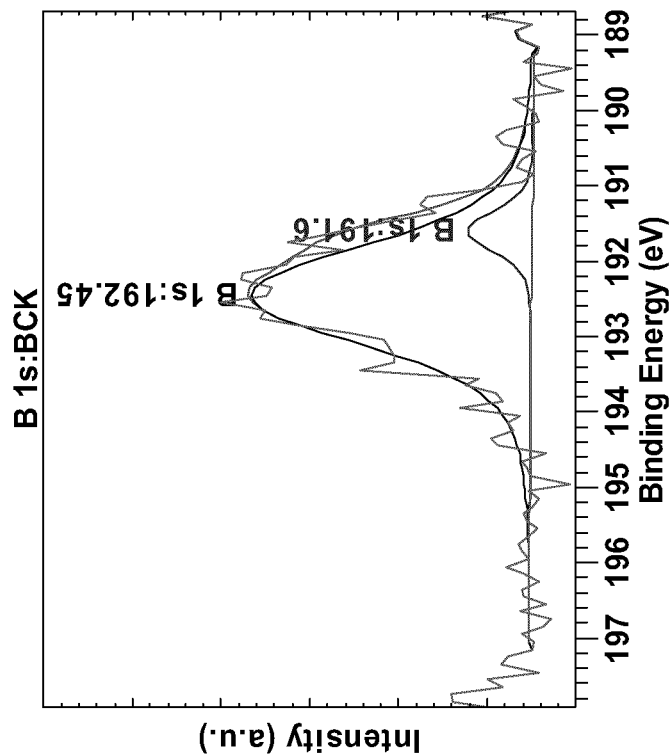
Figure 5C:
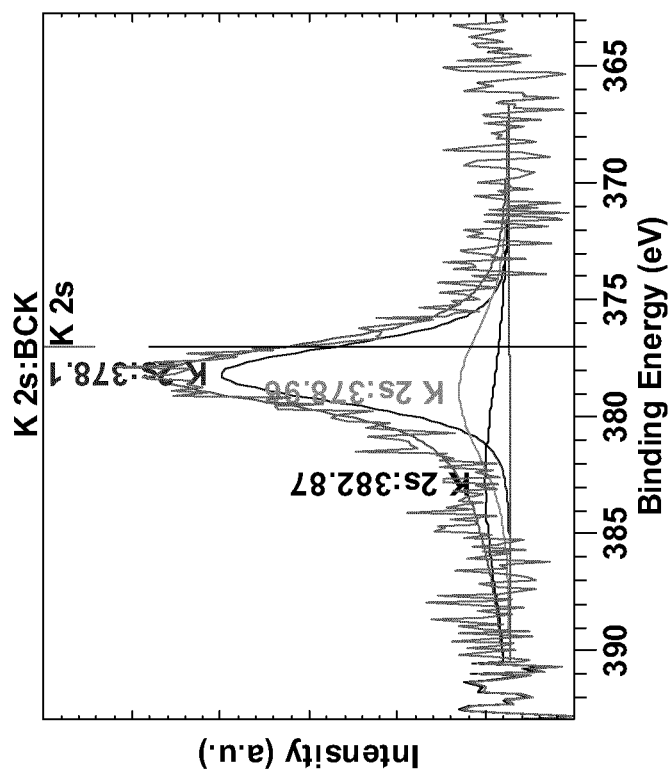

In some embodiments, the content of boron atoms in the hydrogen storage material 10 can vary from 1 at. % to 10 at. %, the content of potassium atoms can vary from 1 at. % to 15 at. %, and the content of oxygen atoms can vary from 1 at. % to 10 at. %. The carbon atoms may connect to boron atoms, potassium atoms or oxygen atoms. The configuration of the atomic structure can vary from sample to sample depending on the content of boron, potassium and oxygen. Referring to FIGS. 5(a) and (b), X-Ray photoelectron spectroscopy (XPS) examinations of the sample material shown in FIG. 3 reveal carbon binds to oxygen in the form of epoxy and hydroxyl with typical C 1 s component binding energies of 282.58 ev, 283.51 eV, 284.19 eV, 284.42 eV and 285.30 eV. (FIG. 5(a)), and with O 1 s component binding energies of 530.27 eV, 532 eV and 535.66 eV. (FIG. 5(b)). Referring to FIGS. 4(c) and (d), the potassium atoms in the sample hydrogen storage material interact with the boron and carbon substrate, and also bind to the oxygen species, with K 2s component binding energies of 378.96 eV and 382.87 eV (FIG. 5(c)), and with B 1s component binding energies of components of 191.6 eV and 192.45 eV (FIG. 5(d)).

Example: Hydrogen Storage Material Manufacture 40 mL sulfuric acid ($H_2SO_4$) was poured into a beaker, and 4 g graphite flakes, 2 g potassium persulfate ($K_2S_2O_8$), and 2 g phosphorus pentoxide ($P_2O_5$) were added into the sulfuric acid with magnetic stirring at room temperature. The stirring was performed for several minutes until all the chemicals were dissolved and a mixture was formed. An oil bath was prepared with its temperature stable at 80° C. The mixture was moved into the 80° C. oil bath, and stirred therein for 4.5 hours. After stirring was finished, the mixture was cooled to room temperature. The mixture was then added to 1 L of deionized water and then stirred for another 15 minutes with no heat. The solution was allowed to settle and then decanted. The resultant slurry was washed by filtration with DI water until its PH value reached 7. The resultant product was collected and dried it in a convection oven at a temperature of 60° C. to product a black powder. The black powder was pre-oxidized graphite which was then used in the next step of the graphene oxide synthesis.

For the graphene oxide synthesis, 90 ml $H_2SO_4$ and 10 mL $H_3PO_3$ were mixed in a beaker, and the mixture was stirred in an ice bath. 18 g $KMnO_4$, was slowly added and the mixture was stirred. The solution was observed to turn green. 4 g pre-oxidized graphite was slowly added into the mixture, and the mixture was stirred for 1 hour in an ice bath. The ice bath was replaced with a 50° C. oil bath, and the mixture was stirred for another 15 hours. The oil bath was moved and the mixture was cooled down to room temperature to produce a slurry. The slurry was transferred into 400 ml of ice water with 10% $H_2O_2$ in it. The solution was allowed to settle and was then decanted. Concentrated hydrochloric acid (HCl) was added into the water to make a 10% HCl solution. The solution was stirred for 15 minutes. The solid content was filtrated out from the solution, and washed by using a centrifugation method until the PH value was close to 7. The product at this point was graphene oxide, which then was subjected to further exfoliation to produce thin layered graphene oxide.

IPA sonication was performed to further exfoliate the graphene oxide in a post-treatment step. A certain amount of IPA was added into the graphene oxide solution until the volumetric ratio between the graphene oxide and IPA became 4:5. The mixture was then sonicated for 1 hour.

To functionalize boron into reduced graphene oxide, a precursor was made by adding boron oxide, boric acid or metaboric acid into the synthesized graphene oxide solution. The mass ratio between boron oxide and GO (dry powder) was 0.5. The mixture was stirred at a temperature of around 65° C. until the precursor was dried. The dried precursor was filled into an alumina boat. The boat was loaded into a temperature stable zone of a tubular furnace. The tubular furnace was pumped with a mechanical pump, and the system was purged with argon gas three times. The furnace temperature was gradually increased to 1200° C. at a rate of 5° C./minute, and the temperature was held constant at 1200° C. for 4 hours, and then decreased back to 20° C. at 5° C./minute. A boron-functionalized reduced graphene oxide grey powder was obtained, which was then filtrated and washed by 1 L of DI water at room temperature. The product was dried in 60° C. convection oven.

To perform potassium decoration, the synthesized boron-functionalized reduced graphene oxide was mixed with potassium hydroxide in a ratio of BC:KOH=2:1. The mixture was stirred and ground with mortar and pestle. The uniformly mixed powder was filled into a nickel boat, which was transferred into a tubular furnace. The furnace was pumped by a mechanical pump, and the furnace was purged with nitrogen gas three times. The furnace temperature was increased to 750° C. at a rate of 5° C./minute, and the temperature was held constant at 750° C. for 2 hours, and then decreased back to 20° C. at 5° C./minute. The obtained greyish boron-functionalized potassium-decorated reduced graphene oxide powder was then filtrated and washed by DI water at room temperature until the PH value reached 8, and then dried at 60° C. in a convection oven, to produce the final product.

Testing Hydrogen Storage by Hydrogen Storage Material

A volumetric Sieverts-like hydrogen measurement apparatus 100 was used to perform measurements of the hydrogen storage material's hydrogen storage properties. The hydrogen measurement apparatus 100 continuously monitors and manipulates the gas molar density (i.e. #molecules/volume) within chambers of known volumes to determine the hydrogen going in or out of the hydrogen storage material 10.

Several methods can be used to characterize the hydrogen storage properties of the hydrogen storage material 100. One example is a pressure-composition-isotherm (PCI) curve measurement. In this PCI measurement, samples of the hydrogen storage material 100 are pressurized from vacuum to 5 Mpa, and then exposed to gradually reduced pressures until vacuum is reached. The plotting of capacity against pressure as PCI curve is employed to demonstrate hydrogen storage properties like capacity and reversibility. The PCI measurement is repeated for certain times to demonstrate the complete processes of adsorption and desorption cycle.

The hydrogen storage performance for the hydrogen storage material 100 synthesized by the method described in the Example is shown in FIG. 6(*a*) for adsorption and FIG. 6(*b*) for desorption respectively. A "zig-zag" behavior is clearly seen in these Figures, which features by capacity increases during both the pressurization and decompression processes. After 7.5 PCI cycles, the capacity reaches a maximum of 4.78 wt. % at room temperature and 5 MPa. Further cycling the sample causes the desorption. Hydrogen is released mainly during the decompression process, and about 70% of the hydrogen adsorbed is released after 5.5 desorption cycles. During the whole desorption process, no heating is applied. The capacity changes with cycling are also shown in FIG. 6(*c*).

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed is:

1. A hydrogen storage product comprising:
a single or multiple layered structure comprising reduced graphene oxide functionalized with boron species and decorated with alkali or alkaline earth metal, wherein each layer of the structure further comprises oxygen atoms bonded with boron to form boron-oxygen functional groups.

2. The hydrogen storage product as claimed in claim 1 wherein each layer of the structure comprises a hexagonal lattice of carbon atoms functionalized with boron atoms.

3. The hydrogen storage product as claimed in claim 2, wherein the alkali or alkaline earth metal is located at binding positions adjacent the boron atoms, or adjacent hollows of the hexagonal lattice, or adjacent carbon-boron bonds, or adjacent the boron-oxygen functional groups.

4. The hydrogen storage product as claimed in claim 1, wherein the alkali or alkaline earth metal is selected from a group consisting of Li, Na, K, Rb, Cs, Be, Mg, Ca, Sr and Ba.

5. The hydrogen storage product as claimed in claim 1, wherein the structure comprises defects with pores large enough for hydrogen molecules to pass through and access adsorption sites on the structure.

6. The hydrogen storage product as claimed in claim 5 wherein the pores have an average diameter of 5 nm to 20 nm.

7. The hydrogen storage product as claimed in claim 1 wherein the structure comprises between one and ten layers.

8. The hydrogen storage product as claimed in claim 7 wherein the distance between layers is between 0.33 nm and 1.0 nm.

9. The hydrogen storage product as claimed in claim 1 comprising an atomic concentration of the boron between 1 at. % and 10 at %.

10. The hydrogen storage product as claimed in claim 1 comprising an atomic concentration of the alkali or alkaline earth metal between 1 at. % and 15 at %.

11. The hydrogen storage product as claimed in claim 3 comprising an atomic concentration of the oxygen between 1 at. % and 10 at %.

* * * * *